United States Patent
Clements

(10) Patent No.: US 8,580,004 B1
(45) Date of Patent: Nov. 12, 2013

(54) UNITARY FILTER CARTRIDGE WITH FLOW TRANSITION MOUTH

(75) Inventor: Jack T Clements, Lees Summit, MO (US)

(73) Assignee: iFil USA, LLC, Harrisville, MO (US)

(*) Notice: Subject to any disclaimer, the term of this patent is extended or adjusted under 35 U.S.C. 154(b) by 214 days.

(21) Appl. No.: 13/011,757

(22) Filed: Jan. 21, 2011

(51) Int. Cl.
*B01D 46/00* (2006.01)

(52) U.S. Cl.
USPC .............. 55/360; 55/378; 55/502; 55/508; 55/529; 55/DIG. 26

(58) Field of Classification Search
USPC ........... 55/302–303, 361–382, 341.1–341.7, 55/482–489, 521, DIG. 26, 490–519; 95/273–287; 210/493.1–494.3
See application file for complete search history.

(56) References Cited

U.S. PATENT DOCUMENTS

| | | |
|---|---|---|
| 1,012,122 A | 12/1911 | Budil |
| 1,743,934 A | 1/1930 | Ruemelin |
| 1,847,368 A | 3/1932 | Wendler |
| 2,072,906 A | 3/1937 | Rosenberger |
| 2,308,309 A | 1/1943 | Runmelin et al. |
| 2,308,310 A | 1/1943 | Ruemelin et al. |
| 2,335,315 A | 11/1943 | Seymour |
| 2,503,568 A | 4/1950 | Timm |
| 2,927,659 A | 3/1960 | Pabst |
| 2,952,332 A | 9/1960 | Metro |
| 2,981,368 A | 4/1961 | Johnson |
| 3,167,415 A | 1/1965 | Edwards |
| 3,170,777 A | 2/1965 | Held |
| 3,243,940 A | 4/1966 | Larson |
| 3,421,295 A | 1/1969 | Swift et al. |
| 3,524,304 A | 8/1970 | Witterneier et al. |
| 3,550,359 A | 12/1970 | Fisher et al. |
| 3,716,436 A | 2/1973 | Pall et al. |
| 3,747,305 A | 7/1973 | O'Dell et al. |
| 3,765,152 A | 10/1973 | Pausch |

(Continued)

FOREIGN PATENT DOCUMENTS

| | | |
|---|---|---|
| DE | 488891 | 10/1889 |
| DE | 1191078 | 4/1961 |

(Continued)

OTHER PUBLICATIONS

Kleisser Company Operating and Maintenance Manual.

(Continued)

*Primary Examiner* — Duane Smith
*Assistant Examiner* — Thomas McKenzie
(74) *Attorney, Agent, or Firm* — Joseph B Bowman

(57) ABSTRACT

A high efficiency unitary cartridge filter for installation with a separate sealing gasket in a generally uniform circular or oblong hole of a baghouse tube sheet. The cartridge includes a plastic or metal tubular core around which is wrapped elongate pleated filter media to form a pleat pack. The pleat pack is sealed at the lower end thereof by a molded cap. A molded upper fitting includes an aerodynamically contoured transition mouth comprising compound radii of curvatures and a bore which closely corresponds to the bore of the tubular core for improved cleaning power and increased pressure during a cleaning cycle and for reduced pressure drop during normal filtering operation. The molded top may optionally incorporate and bond with a metal collar for added structural integrity and may also incorporate electrical grounding elements for grounding a metal core to the baghouse tube sheet.

18 Claims, 12 Drawing Sheets

(56) References Cited

U.S. PATENT DOCUMENTS

| | | | | |
|---|---|---|---|---|
| 3,774,458 | A | 11/1973 | Kitai et al. | |
| 3,774,769 | A | 11/1973 | Smith | |
| 3,791,111 | A | 2/1974 | Kroll | |
| 3,826,066 | A | 7/1974 | Higgins | |
| 3,830,042 | A | 8/1974 | MacDonnell | |
| 3,837,151 | A | 9/1974 | Jensen | |
| 3,844,750 | A * | 10/1974 | Ray | 55/379 |
| 3,853,509 | A | 12/1974 | Leliaert | |
| 3,876,402 | A | 4/1975 | Bundy et al. | |
| 3,942,962 | A | 3/1976 | Duyckinck | |
| 3,997,305 | A | 12/1976 | Ulvestad et al. | |
| 4,007,026 | A | 2/1977 | Groh | |
| 4,073,632 | A | 2/1978 | Reinauer et al. | |
| 4,105,421 | A | 8/1978 | Rheinfrank, Jr. et al. | |
| 4,159,197 | A | 6/1979 | Schuler et al. | |
| 4,187,091 | A | 2/1980 | Durre et al. | |
| 4,218,227 | A | 8/1980 | Frey | |
| 4,219,343 | A | 8/1980 | Peterson | |
| 4,247,314 | A | 1/1981 | Smoluchowski et al. | |
| 4,256,473 | A | 3/1981 | De Martino | |
| 4,270,935 | A | 6/1981 | Reinauer et al. | |
| 4,272,263 | A | 6/1981 | Hancock | |
| 4,276,069 | A | 6/1981 | Miller | |
| 4,291,904 | A | 9/1981 | Iversen et al. | |
| 4,292,057 | A | 9/1981 | Ulvestad et al. | |
| 4,312,648 | A | 1/1982 | Day | |
| 4,319,897 | A | 3/1982 | Labadie | |
| 4,322,231 | A | 3/1982 | Hilzendeger et al. | |
| 4,344,781 | A | 8/1982 | Higgins et al. | |
| 4,424,070 | A | 1/1984 | Robinson | |
| 4,436,536 | A * | 3/1984 | Robinson | 55/341.1 |
| 4,443,237 | A | 4/1984 | Ulvestad et al. | |
| 4,445,915 | A | 5/1984 | Robinson | |
| 4,560,477 | A | 12/1985 | Moldow | |
| 4,632,680 | A | 12/1986 | Klimczak | |
| 4,655,806 | A | 4/1987 | Bowersox | |
| 4,663,041 | A | 5/1987 | Miyagi et al. | |
| 4,732,678 | A | 3/1988 | Humbert, Jr. | |
| 4,813,985 | A | 3/1989 | Brennecke et al. | |
| 4,878,930 | A | 11/1989 | Manniso et al. | |
| 4,929,354 | A | 5/1990 | Meyering et al. | |
| 4,954,255 | A | 9/1990 | Muller et al. | |
| 5,074,896 | A | 12/1991 | Baert et al. | |
| 5,173,098 | A | 12/1992 | Pipkorn | |
| 5,207,811 | A | 5/1993 | Buonpastore | |
| 5,207,812 | A | 5/1993 | Tronto et al. | |
| 5,211,846 | A | 5/1993 | Kott et al. | |
| 5,222,488 | A | 6/1993 | Forsgren | |
| 5,290,441 | A | 3/1994 | Griffin et al. | |
| 5,290,446 | A | 3/1994 | Degen et al. | |
| 5,308,369 | A | 5/1994 | Morton et al. | |
| 5,336,405 | A | 8/1994 | Tang et al. | |
| 5,536,290 | A | 7/1996 | Stark et al. | |
| 5,632,791 | A | 5/1997 | Oussoren et al. | |
| 5,730,766 | A * | 3/1998 | Clements | 55/341.1 |
| 5,746,792 | A | 5/1998 | Clements et al. | |
| 5,885,314 | A | 3/1999 | Oussoren et al. | |
| 6,017,378 | A | 1/2000 | Oussoren et al. | |
| 6,203,591 | B1 | 3/2001 | Clements et al. | |
| 6,358,292 | B1 | 3/2002 | Clements et al. | |
| 6,375,698 | B1 | 4/2002 | Clements et al. | |
| 6,440,188 | B1 | 8/2002 | Clements et al. | |
| 6,676,722 | B1 | 1/2004 | Clements et al. | |
| 6,726,735 | B1 | 4/2004 | Oussoren et al. | |
| 6,858,052 | B2 | 2/2005 | Clements | |
| 7,186,284 | B2 | 3/2007 | Clements | |
| 7,585,343 | B2 | 9/2009 | Clements | |
| D626,208 | S | 10/2010 | Clements | |
| 2003/0089234 | A1* | 5/2003 | Bjarno et al. | 95/280 |
| 2004/0237483 | A1* | 12/2004 | Clements | 55/341.1 |

FOREIGN PATENT DOCUMENTS

| | | |
|---|---|---|
| GB | 242388 | 11/1925 |
| GB | 636439 | 4/1950 |
| GB | 840570 | 7/1960 |
| GB | 990587 | 4/1965 |
| GB | 1016556 | 1/1966 |
| GB | 1081516 | 8/1967 |
| GB | 0160168 | 11/1985 |
| GB | 0213930 | 3/1987 |
| GB | 2195558 | 4/1988 |
| GB | 0520737 | 12/1992 |
| GB | 8500198 | 12/1998 |
| NL | 37163 | 5/2001 |

OTHER PUBLICATIONS

Poly Sump & Sweage Basins; AK Industries Inc., Jun. 2002, p. 10.
WAM GmbH Dust Collectors Literature, 035/94.1.
WAMECO Spart Parts, p.03505.R.24.

* cited by examiner

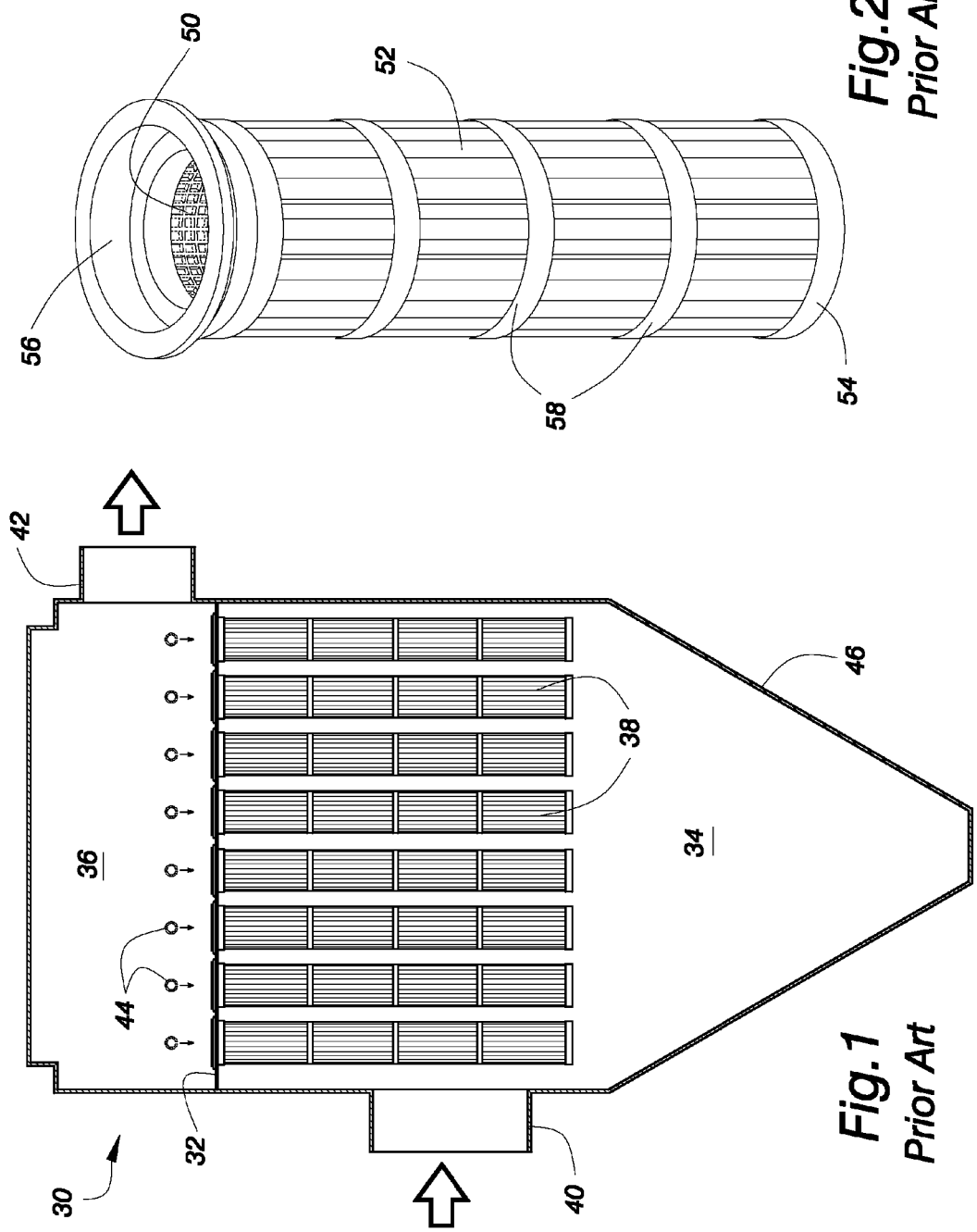

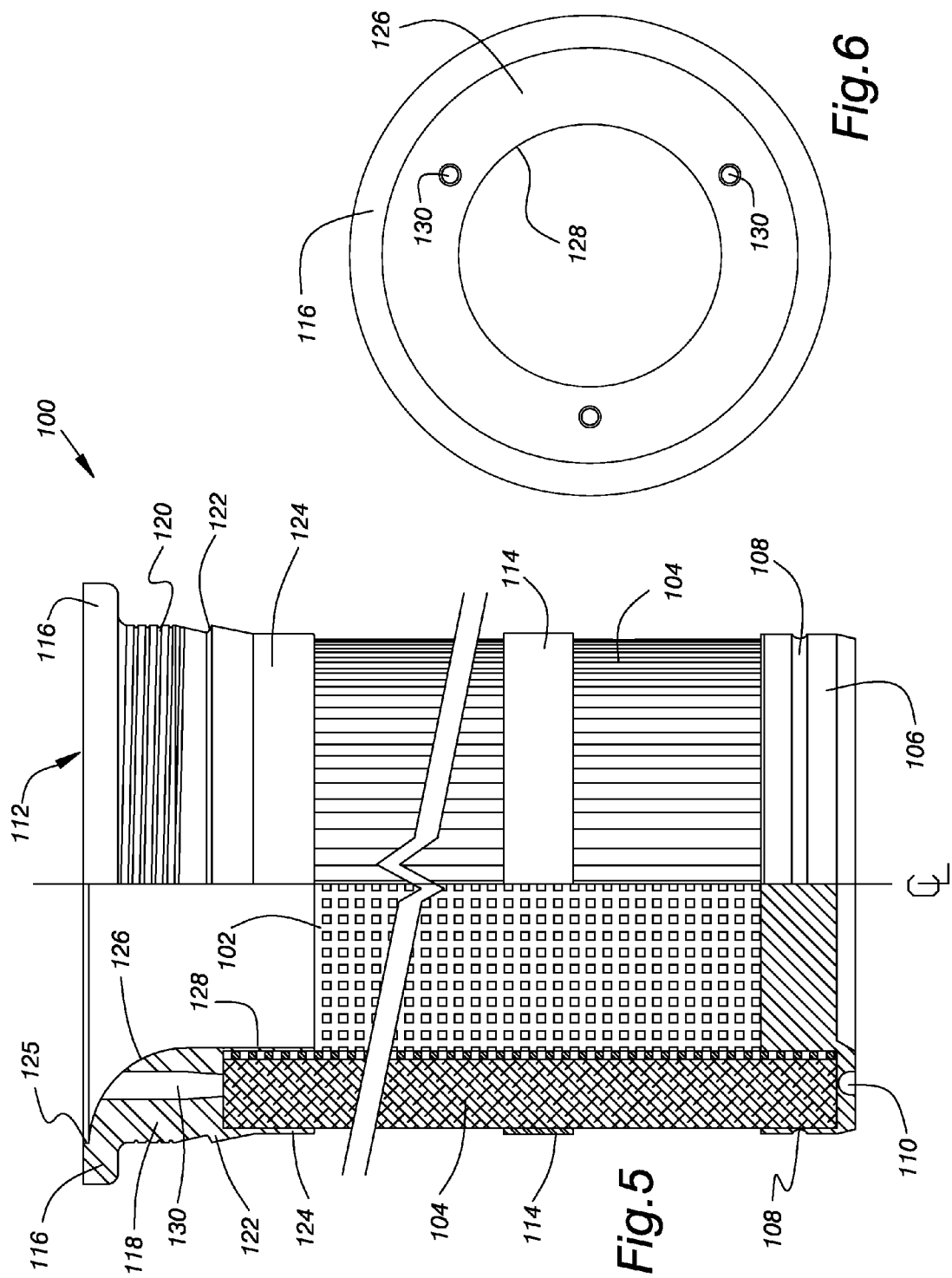

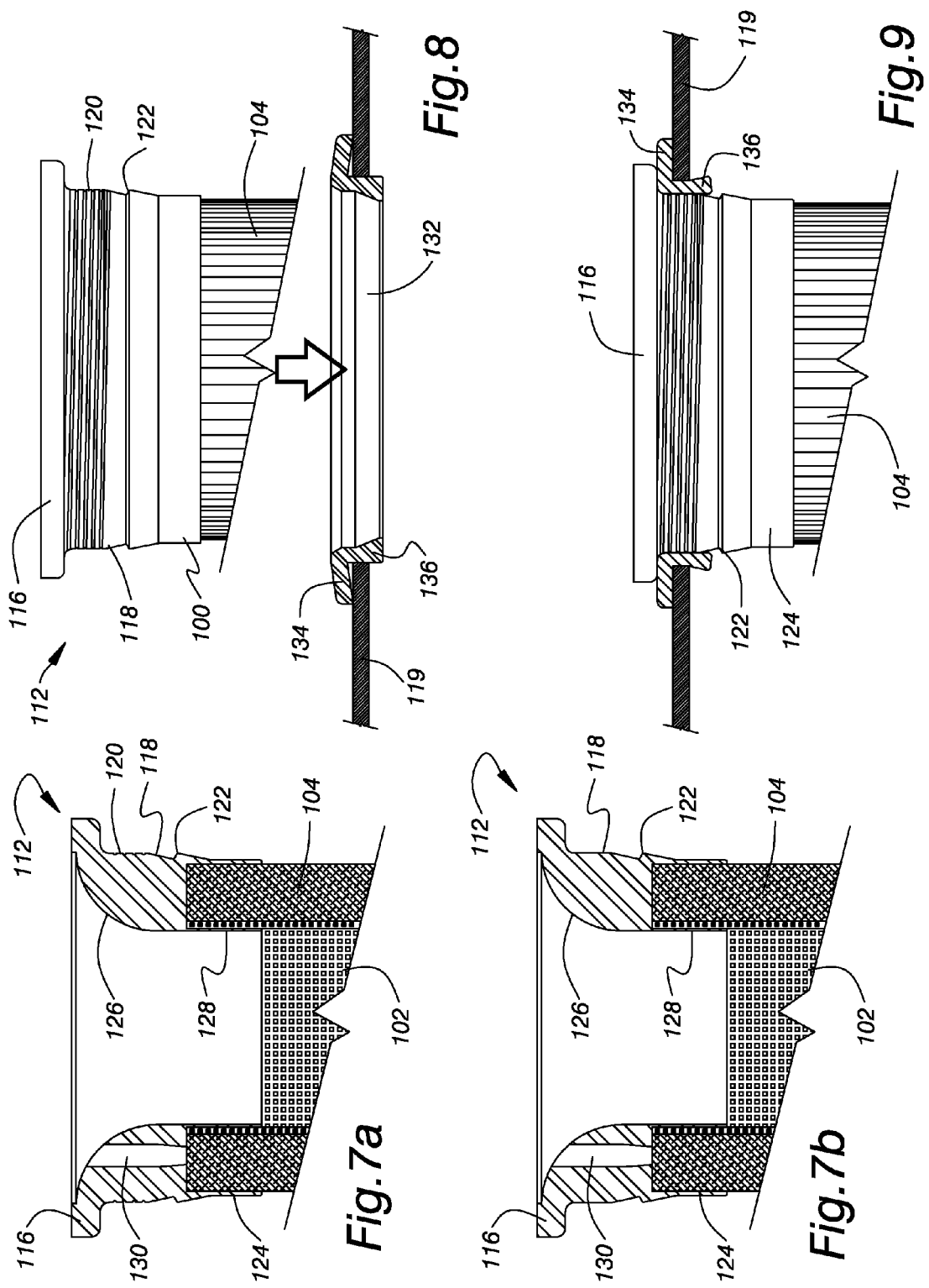

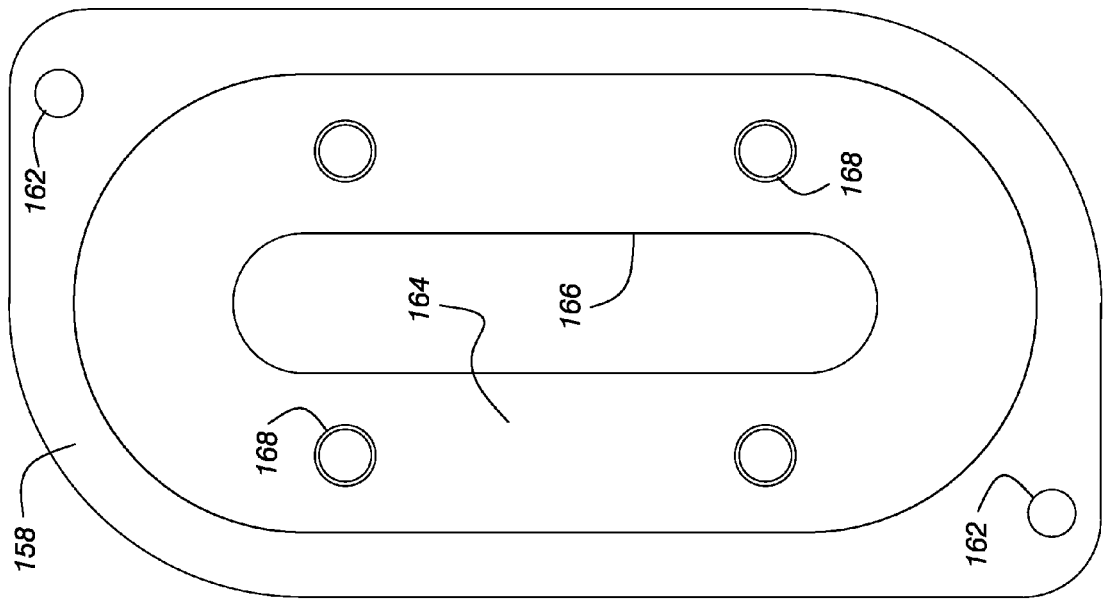
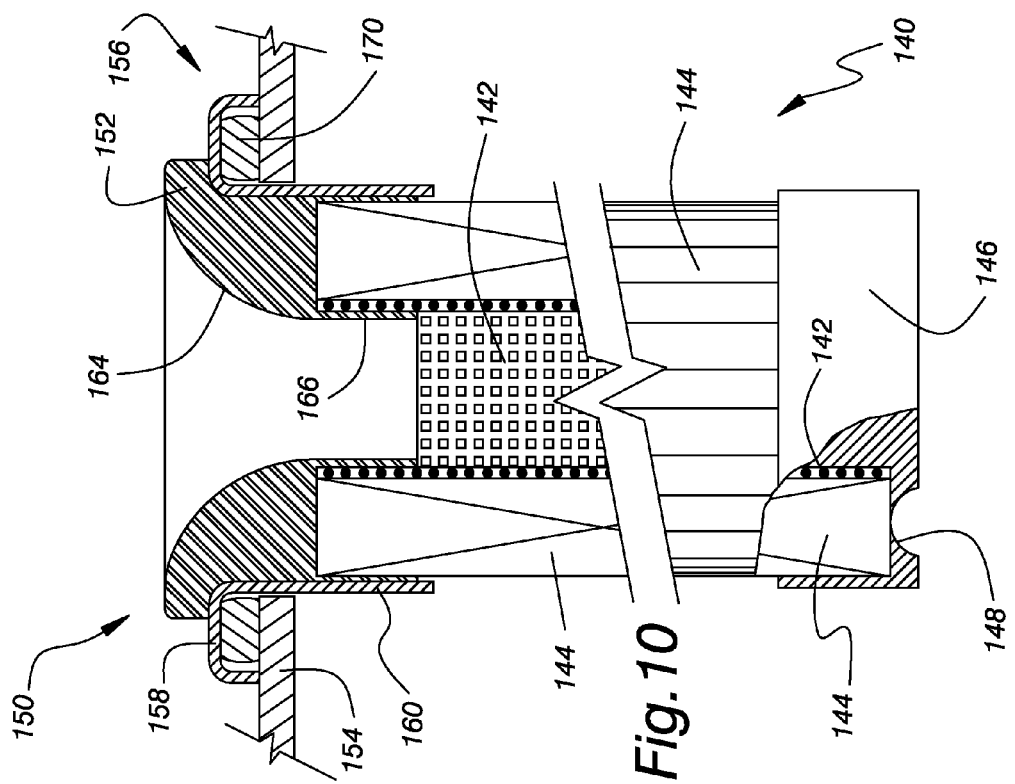
Fig. 10
Fig. 11

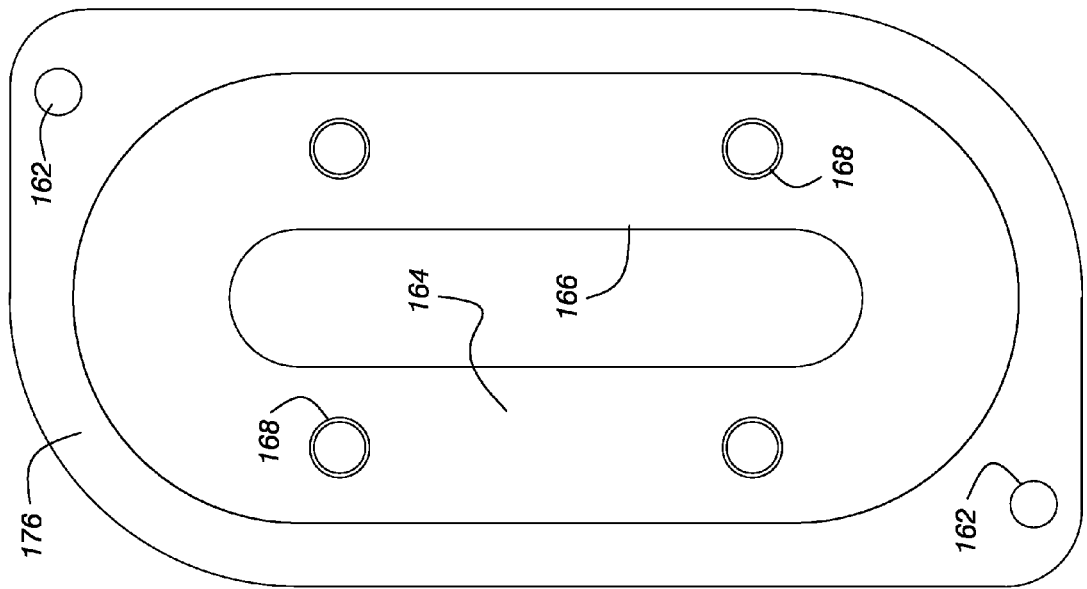
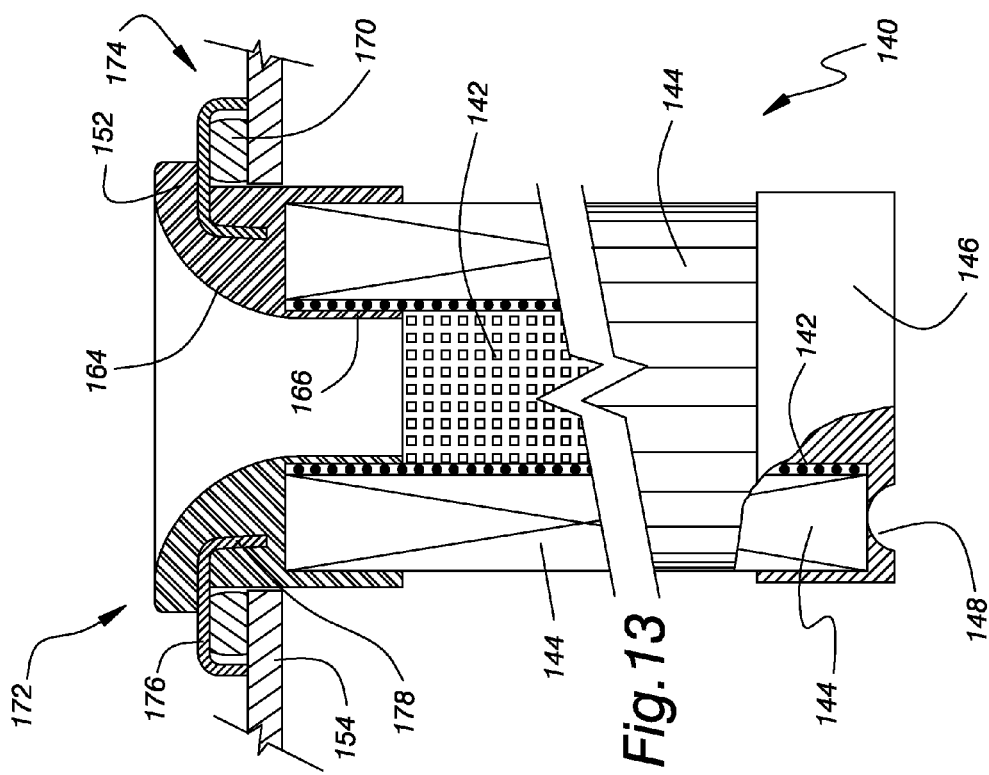
Fig. 13
Fig. 14

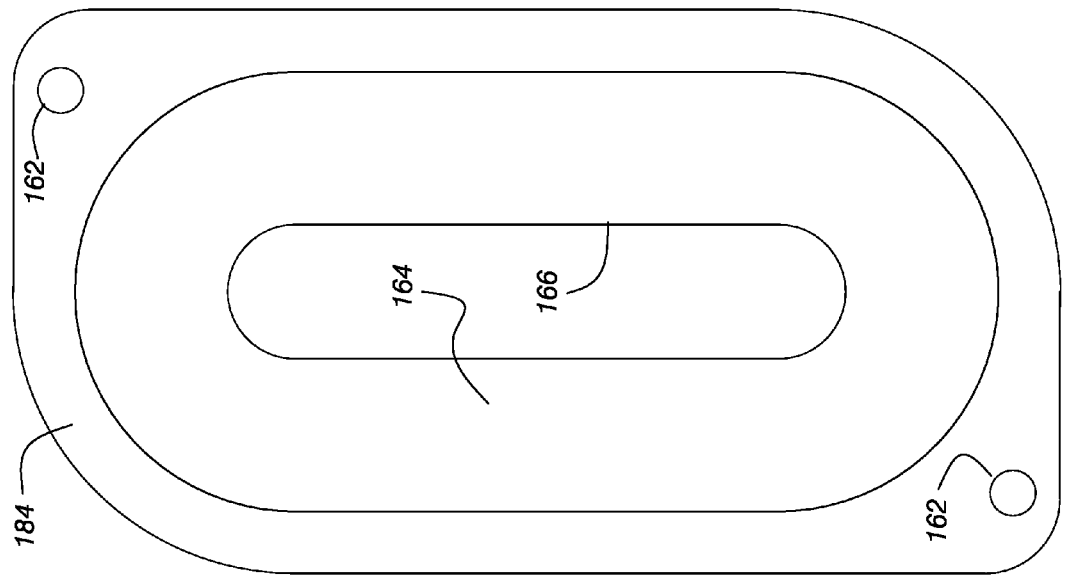
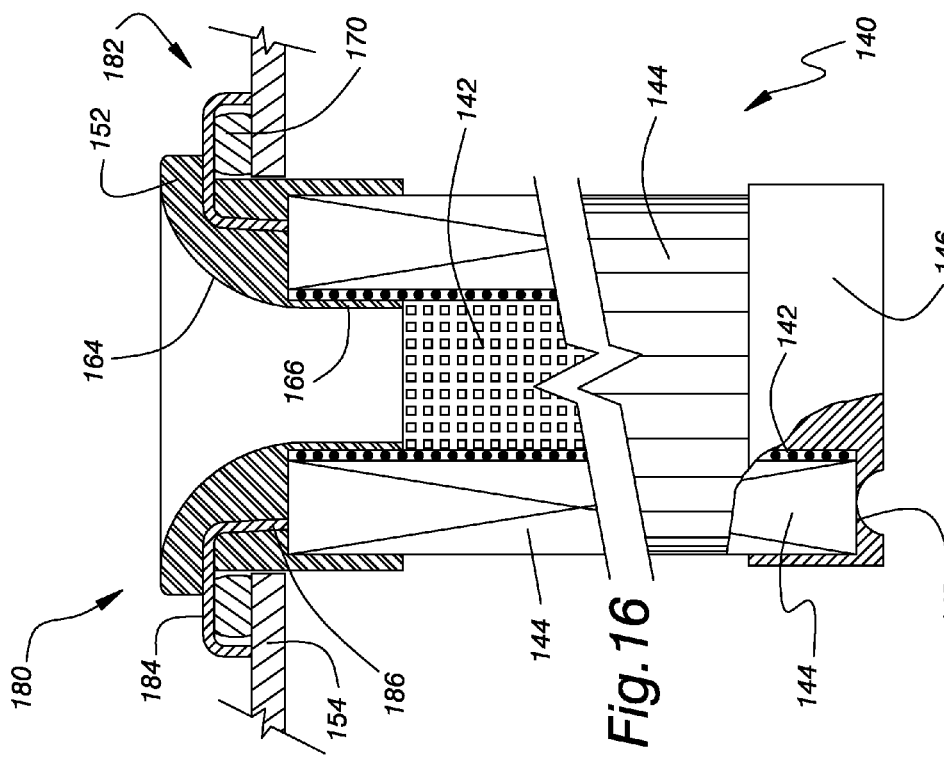
Fig.16
Fig.17

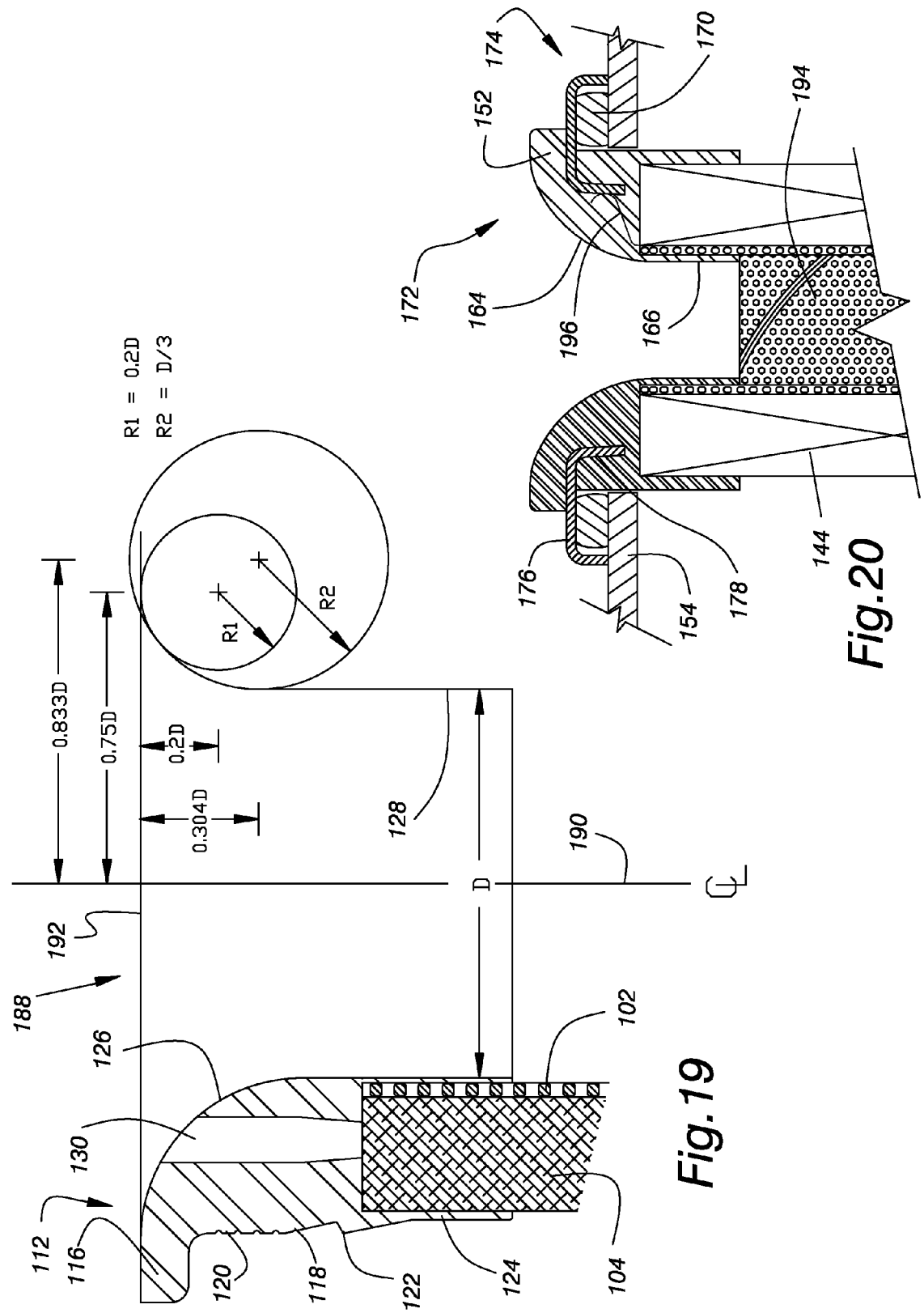

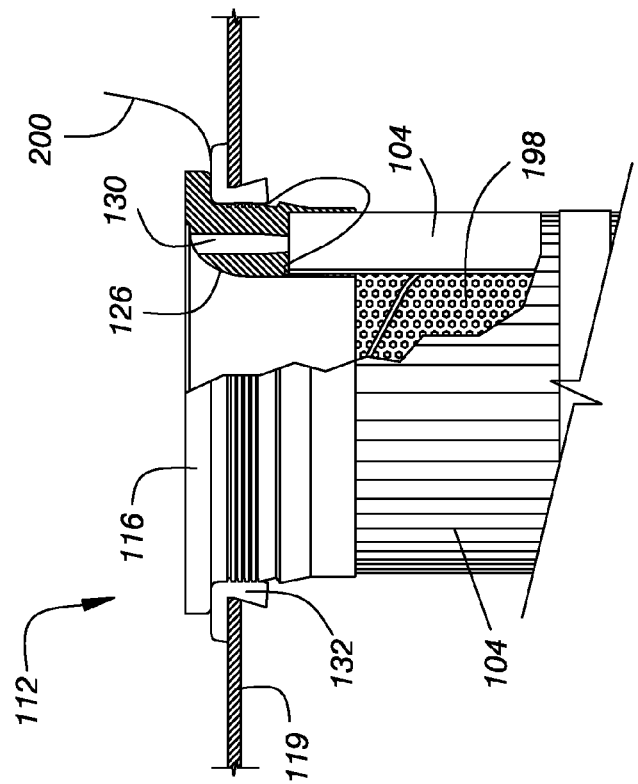
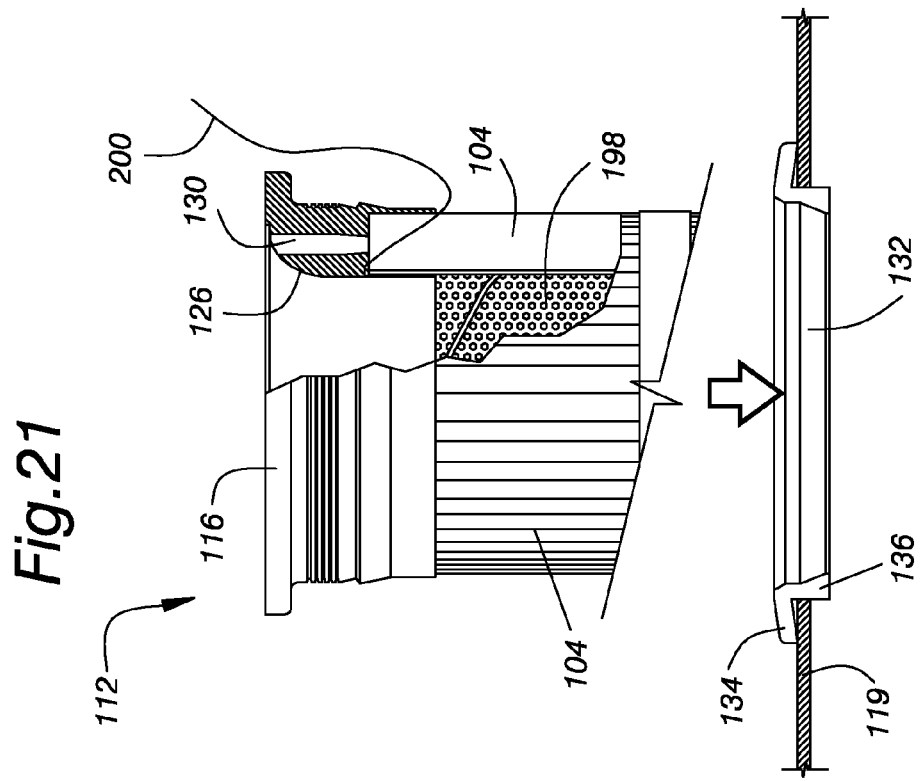

UNITARY FILTER CARTRIDGE WITH FLOW TRANSITION MOUTH

CROSS-REFERENCE TO RELATED APPLICATIONS

This application has no related applications.

STATEMENT REGARDING FEDERALLY SPONSORED RESEARCH OR DEVELOPMENT

The inventions described and claimed in this application were not made under federally sponsored research and development.

BACKGROUND OF THE INVENTION

The present invention generally relates to cartridge filters for a pulse-jet industrial baghouse. More specifically, the invention relates to a unitary cartridge filter with an aerodynamic flow transition mouth for significantly improved filtering and cleaning performance.

Continuous emphasis on environmental quality has resulted in increasingly strenuous regulatory controls on industrial emissions. One technique which has proven highly effective in controlling air pollution has been separation of undesirable particulate matter from a gas stream by fabric filtration. Such filtration is carried out in dust collection apparatus known in the trade as a "baghouse" which operates on the same general principle as an ordinary household vacuum cleaner, except on a much larger scale. Basically, the baghouse is a sheet metal housing divided into two chambers, referred to as plenums, by a tube sheet. Disposed within uniform openings in the tube sheet are elongate filters. A particulate laden gas stream induced by the action of a fan, flows into one chamber (dirty air plenum) wherein dust accumulates on the filter media as the gas passes through the filter into the other plenum (clean air plenum) and out an exhaust.

Although all baghouses are designed in accordance with the foregoing general principles, there are numerous operational and structural distinctions including numerous differences in the construction of the filters themselves. The present invention relates to a baghouse with uniformly sized openings in the tube sheet adapted for use with cartridge filters.

A modern cartridge filter characteristically includes a central structural tube or core manufactured from a foraminous plastic or metal material. Circumscribing the central core is a ring of pleated filter media. A molded bottom end cap terminates the lower ends of both the core and filter media, commonly referred to as the pleat pack. The upper end of the pleat pack is terminated with an open mouthed, molded fitting sealed in one of several manners with the tube sheet. Filtration of the process gas therefore occurs from outside to inside of the filters (i.e., the dust collects on the outside surface of the pleated filter media) as the gas passes through the filter media, through the tubular core material and up to the dirty air plenum.

During continuous operation of the baghouse, the filters must be periodically cleaned and the accumulated dust removed. In a pulse-jet baghouse, cleaning is accomplished by delivering a short blast of high pressure air into the mouth of an individual filter cartridge. The higher pressure cleaning air temporarily overcomes the normal flow of process gas through the filter and travels the length of the cartridge to dislodge the dust cake accumulated on the outside of the filter pleats. The dust cake falls from the filter pleats to the hopper shaped bottom of the dirty air plenum for removal by an auger or similar means. At this point, the momentary effect of the short blast of cleaning air has dissipated and the normal flow of process gas though the cartridge filter resumes.

One of the earliest developments in a unitary cartridge filter is taught in my U.S. Pat. No. 5,632,791 showing a pleated filter with a closed bottom and a molded top configured with a peripheral exterior groove to sealingly mate with the circular opening through the tube sheet of the baghouse. The molding material was preferably a urethane having a durometer of between 30 to 70 shore A. Also important was a dimensional limitation to satisfy the relationship of $0.3 < H/D < 0.85$ where D was the diameter of the tube sheet hole and H was the distance between the peripheral groove and the top of the pleat pack encased in the molding material. The foregoing two features, in combination, permitted sufficient resiliency for the upper portion of the top fitting to deform during installation or removal of the filter in the tube sheet and also to provide a reasonably effective seal between the peripheral groove and the tube sheet opening. The effectiveness of that seal could be further improved however by using a metal snap band positioned inside the mouth of the filter to push outwardly on the top fitting and to urge the peripheral groove to tighter engagement with the tube sheet. Such filters came to be known in the industry as "stepped-top" filters.

While the earliest unitary filter cartridges were formed as cylindrical constructions, eventually the need arose to adapt the features of unitary filter cartridges to non-round shapes in baghouses having oval or oblong openings. My patent U.S. Pat. No. 5,730,766 generally adapted the foregoing principles of stepped-top filter construction to a filter for an oblong opening. Due to the cross sectional length of the opening, here a snap band was mandatory in order to maintain an effective seal between the peripheral sealing groove of the top fitting and the tube sheet of the baghouse.

In U.S. Pat. No. 6,299,662, Poulsen used a metal expander in place of a snap band to achieve greater elastic compression of the upper collar of a stepped-top cylindrical filter cartridge for sealing against the tube sheet to accommodate variances in uniform circular hole size in the tube sheet openings. While achieving an improved seal, the expander naturally increased the expense associated with the filter cartridges and required a separate, specially manufactured part. Additional examples of a similar approach to the sealing problem are shown in U.S. Pat. No. 6,726,735 of Oussoren et al in which various configurations of the molded top were used in conjunction with an expander inserted into a stepped-top filter to try to achieve a more effective seal between the filter cartridge and the tube sheet opening. Obviously any leaks at all in this critical area impaired the filtering operation.

One source of such leaks was inherent in the molding process used in forming the top fitting of the filter cartridge. In order to mold the undercut surfaces forming the peripheral sealing groove in the top fitting, a two part mold was required. This left two external parting lines running vertically at opposite ends of the filter diameter caused by the halves of the mold forming the top fitting. This problem was exacerbated significantly with any mismatch between the mold halves during the manufacturing process. Such imperfections in the finished filter cartridge render sealing to the tube sheet very problematic.

One approach to overcome sealing issues is to provide a separate seal to the filter cartridge itself. Both my U.S. Pat. Nos. 6,858,052 and 7,186,284 provide examples of this approach. The sealing gasket is formed of a resilient elastomeric and is fitted into the tube sheet hole. The filter cartridge is then inserted through the central bore of the gasket to provide the necessary force to urge the gasket to engagement with the tube sheet. Now, instead of the top fitting portion of the filter cartridge being resiliently deformable, the top portion was required to be rigid in order to compress the sealing gasket. This was achieved by greatly reducing the H/D ratio such that the upper end of the pleat pack extended almost to the top flange of the cartridge to be positioned adjacent the tube sheet when the filter was installed. While providing the necessary rigidity to the filter, some drawbacks did exist with this solution. The interior thickness of the molding material had to be increased to sufficiently encase the pleat pack which, in turn, reduced the bore of the filter mouth. In addition, shrinking of the molding material caused extreme dimensional variations in the molded top which resulted in leakage problems.

On the positive side, as shown particularly in U.S. Pat. No. 7,186,284, an undercut surface to form a peripheral sealing groove was no longer necessary and the exterior side wall of the top fitting could thus be molded without undercut in a one piece mold to eliminate vertical parting lines in the finished product. With this development, however, a new problem arose. During the curing process, the molding material between successive pleats in the pleat pack would shrink slightly so that the outside surface of the top fitting had more of a scalloped configuration around the edges of the pleats than a smooth cylindrical surface. This represented potential leakage regions in situations where the filter cartridge, sealing gasket and hole size of the tube sheet were outside normal tolerances.

In the cleaning of baghouse filters, numerous structural and operational differences have been examined in an effort to improve efficiency. As these relate to the background of the present invention, many enhancements to the cleaning cycle have been proposed. Commonly accepted wisdom suggests that the use of a venturi in conjunction with pulse-jet technology wherein a short blast of high pressure air is delivered to the mouth of an individual filter cartridge improves cleaning efficiency. The intended effect of the venturi structure is to entrain aspirated or secondary air with the initial blast of high pressure cleaning air blast to overcome the normal flow of process gas through the filter and to travel the length of the cartridge to dislodge the dust cake accumulated on the outside of the filter pleats. Effective cleaning power is achieved by a combination of two physical characteristics—that is, fluid flow through the filter media and pressure drop across the filter media. A venturi is known to increase the fluid flow during the cleaning cycle which improves cleaning performance. However, it is also know that the venturi structure itself increases pressure drop across the filter during normal filtering operation and this is a deleterious effect to the overall baghouse operation since any subsequent cleaning cycle must overcome the overall pressure differential of the filter cartridge itself, the accumulated dust cake, the opposing process gas flow and the physical characteristics of the equipment involved such as the venturi itself.

Accordingly, in spite of the advancements made to date in the filtering arts, a need remains for a highly efficient unitary cartridge filter which minimizes pressure drop for both filtering and cleaning cycles and which maximizes cleaning power over a range of operating conditions. There is also a need for a high efficiency unitary cartridge filter to effectively seal with circular and oblong sized tube sheet holes within manufacturing tolerances in order to minimize leakage of process gas from the dirty air plenum to the clean air plenum. The primary objectives of this invention are to meet these diverse needs.

SUMMARY OF THE INVENTION

More specifically, an object of the invention is to provide a high efficiency unitary cartridge filter which minimizes pressure drop for both filtering and cleaning cycles and which maximizes cleaning power over the normal range of baghouse operating conditions. As compared with conventional stepped-top filter cartridges, the filter of this invention is capable of increasing available cleaning pressure by more than 10% and increasing pulse-jet cleaning flow by 15% which yields total cleaning power increased by more than 25%. Such performance is achieved without the additional pressure drop experienced during normal filtering operation when venturi equipment has heretofore been necessary to boost cleaning flow.

A corollary object of the invention is to provide a high efficiency unitary cartridge which yields an increase in total cleaning power by more than 25% over conventional stepped-top cartridges. The benefits achieved by increasing the total cleaning power include lower filtering mode system resistance and less frequent pulse cleaning cycles required for a given operating period, so less compressed air is needed. These advantages therefore combine to result in lower energy consumption for baghouse operation.

Another object of the invention is to provide a high efficiency unitary cartridge filter of the character described with an aerodynamically contoured transition mouth to minimize pressure drop during both filtering and cleaning cycles.

Another object of the invention is to provide a high efficiency unitary cartridge filter of the character described with an aerodynamically contoured transition mouth comprising compound radii of curvatures for improved gas flow to the bore of the filter.

A further object of the invention is to provide a high efficiency unitary cartridge filter of the character described wherein the bore of the transition mouth closely matches the bore of the cartridge filter itself in order to minimize pressure drop during both the filtering and cleaning cycles.

An additional object of the invention is to provide a high efficiency unitary cartridge filter having the benefits as previously described and also being effectively sealed with the aid of a separate sealing gasket against the tube sheet openings within acceptable tolerances in order to prevent leakage of process gas from the dirty air plenum to the clean air plenum.

Yet another object of the invention is to provide a high efficiency unitary cartridge filter having a spiral thread on the exterior side wall of the molded top fitting in order to assist with a secure rotational fit during filter installation and to assist in filter removal by application of a torsional force.

A further object of the invention is to provide a high efficiency unitary cartridge filter having the benefits as previously described with a top fitting molded in a single piece mold to eliminate any vertical mold parting lines characteristic of prior art stepped-top cartridge filters.

A corollary object of the invention is to provide a high efficiency unitary cartridge filter constructed in accordance with the foregoing features and easily adaptable either to round, circular tube sheet openings or to oblong tube sheet openings.

Another object of the invention is to provide a high efficiency unitary cartridge filter constructed in accordance with the foregoing features which are equally adaptable to filter cartridges having either plastic or metallic central cores.

A further object of the invention is to provide a high efficiency unitary cartridge filter constructed in accordance with the foregoing features adaptable to filter cartridges having a metallic central core which may be easily electrically grounded to the baghouse tube sheet.

Yet a further object of the invention is to provide a high efficiency unitary cartridge filter wherein the molded top fitting may be integrally combined with a metal collar for increased skeletal support and structural integrity to resist deformation.

In summary, an object of the invention is to provide a high efficiency unitary cartridge filter for installation with a separate sealing gasket in a generally uniform circular or oblong hole of a baghouse tube sheet. The cartridge includes a plastic or metal tubular core around which is wrapped elongate pleated filter media to form a pleat pack. The pleat pack is sealed at the lower end thereof by a molded cap. A molded upper fitting includes an aerodynamically contoured transition mouth comprising a compound radius of curvature and a bore which closely corresponds to the bore of the tubular core for improved cleaning power and increased pressure during a cleaning cycle and for reduced pressure drop during normal filtering operation. The molded top may optionally incorporate and bond with a metal collar for added structural integrity and may also incorporate electrical grounding elements for grounding a metal core to the baghouse tube sheet.

Other and further objects of the invention, together with the features of novelty appurtenant thereto, will appear in the course of the detailed description of the drawings.

BRIEF DESCRIPTION OF THE DRAWINGS

In the following description of the drawings, in which like reference numerals are employed to indicate like parts in the various views:

FIG. 1 is a sectional, side elevation view illustrating a conventional baghouse configuration for cartridge filters;

FIG. 2 is a perspective view of a circular prior art filter cartridge with a stepped-top for use in an industrial baghouse;

FIG. 5 is a side elevational view, partially sectional, of a circular filter cartridge constructed in accordance with one embodiment of the invention, wherein the broken lines indicate discontinuous length;

FIG. 6 is a reduced top plan view of the filter shown in FIG. 5;

FIG. 7a is a fragmentary, fully sectional view of the filter cartridge similar to that shown in FIG. 5;

FIG. 7b is a fragmentary sectional view of a filter cartridge similar to that shown in FIG. 7a but illustrating a straight sidewall variation on the molded top portion of the filter;

FIG. 8 is a fragmentary side elevation view of the filter cartridge shown in FIG. 5 or 7a prior to installation in the tube sheet of a baghouse;

FIG. 9 is a fragmentary side elevational view of the filter cartridge shown in FIG. 8 fully installed in the tube sheet of a baghouse;

FIG. 10 is a side sectional view of an oblong filter cartridge constructed in accordance with a second embodiment of the invention, wherein the broken lines indicate discontinuous length;

FIG. 11 is a top plan view of the filter cartridge shown in FIG. 10;

FIG. 13 is a side sectional view of an oblong filter cartridge constructed in accordance with a third embodiment of the invention, wherein the broken lines indicate discontinuous length;

FIG. 14 is a top plan view of the filter cartridge shown in FIG. 13;

FIG. 16 is a side sectional view of an oblong filter cartridge constructed in accordance with a fourth embodiment of the invention, wherein the broken lines indicate discontinuous length;

FIG. 17 is a top plan view of the filter cartridge shown in FIG. 16;

FIG. 19 is a schematic view illustrating the construction of a preferred compound curvature applied to the interior shoulder of the filter cartridge mouth;

FIG. 20 is a fragmentary side elevational view of a filter cartridge similar to that shown in FIG. 13 but having a metal core with an imbedded grounding spring engaging the metal flange cap;

FIG. 21 is a fragmentary side elevational view, partially sectional, of a filter cartridge similar to that shown in FIGS. 5-9 but having a metal core and an external grounding wire; and FIG. 22 is a fragmentary side elevational view of the filter cartridge shown in FIG. 20 installed in the tube sheet of a baghouse.

DETAILED DESCRIPTION OF THE DRAWINGS

Figure 4:
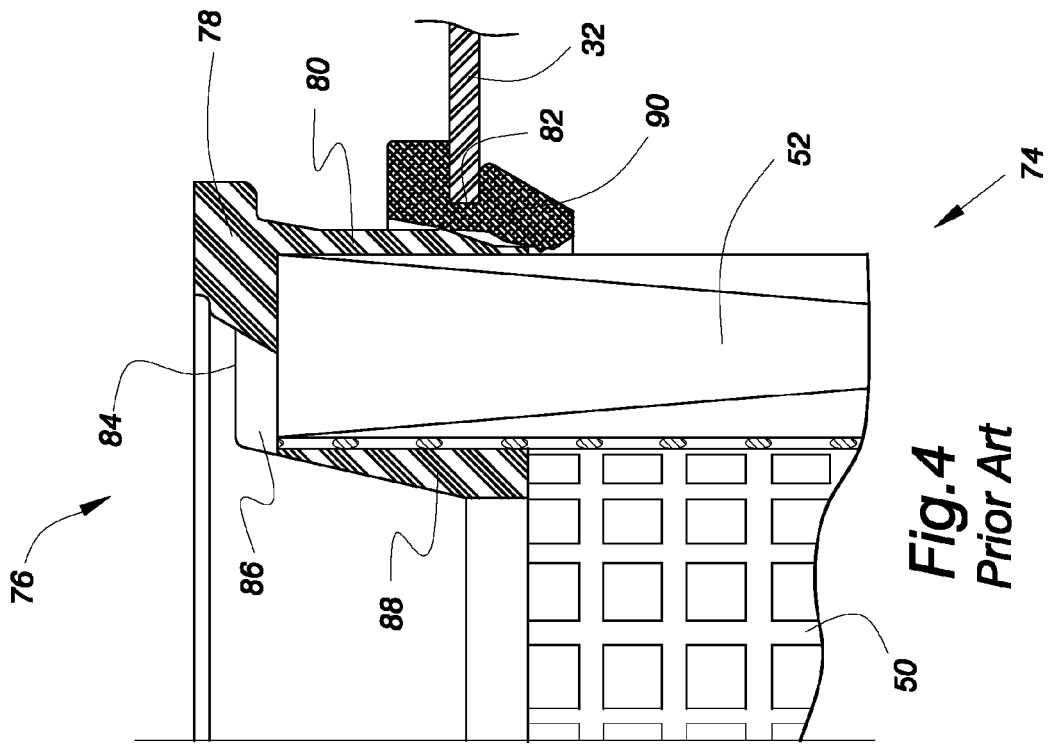
FIG. 4 is a fragmentary, side sectional view of a prior art filer cartridge molded form a rigid molding compound to be installed on the tube sheet of a baghouse with a resilient sealing gasket.

Referring to the drawings in greater detail, attention is first focused on the prior art illustrations shown in FIGS. 1 through 4. FIG. 1 illustrates, somewhat schematically, the major components of a pulse-jet baghouse. A large sheet metal housing 30 is divided by a horizontally support tube sheet 32 into a dirty air plenum 34 and a clean air plenum 36. Vertically suspended through uniform openings in the tube sheet 32 is a plurality of pleated filter cartridges 38. Inlet ductwork 40 delivers particulate laden gas to the dirty air plenum 34. As the gas passes through the filter cartridges 38 and into the clean air plenum 36, dust accumulates on the exterior surface of the filters 38. The scrubbed process gas is discharged from the clean air plenum 36 through an exhaust duct 42 to the atmosphere or to additional processing such as heat recovery equipment (not shown).

Positioned in the clean air plenum above the rows of filters 38 are high pressure air pipes 44 with orifices registering above the mouths of the filters 38. As dust builds up, the filter cartridges 38 must be periodically cleaned. This is accomplished by delivering a short blast of high pressure air to one or more rows of the filters 38. The high pressure air blast enters the mouth of the filter 38 and travels the length of the pleated media to dislodge any accumulated dust cake from the exterior surface of the filters 38. That dislodged dust falls by gravity into the hopper shaped section 46 of the baghouse 30 where it may be subsequently removed by an auger or similar equipment (not shown). Those filters 38 or rows of filters 38 not being subjected to the high pressure cleaning air cycle remain in normal filtering service.

Figure 3:
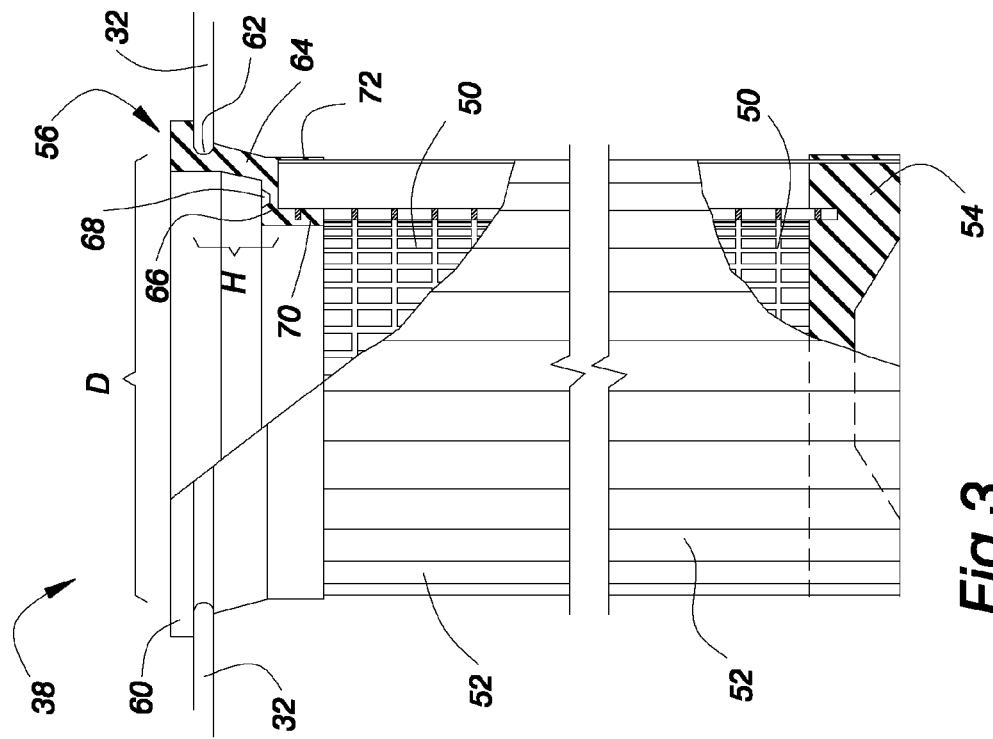
FIG. 3 is an enlarged, side elevational view, partially sectional, of the prior art filter cartridge shown in FIG. 2 installed on the tube sheet of a baghouse.

A typical prior art, cylindrical stepped-top filter cartridge 38 is illustrated in FIGS. 2 & 3 for application in uniform circular holes of a baghouse tube sheet 32. The cartridge 38 includes a central cylindrical core 50 formed by foraminous plastic. Circumscribing the central core 50 is a cylindrical ring of pleated filter media 52. The combination of the pleated filter media 52 supported on the core 50 is commonly referred to as the pleat pack. A molded bottom end cap 54 sealingly closes the lower ends of both the core 50 and filter media 52 of the pleat pack. The upper end of the pleat pack is terminated with an open mouthed, molded top fitting 56, the details of which as best seen in FIG. 3. Intermediate the top fitting 56 and the bottom end cap 54 are retaining bands 58, shown in FIG. 2, spaced apart along the length of the filter cartridge 38. The retaining bands 58 serve to limit flexure of the pleated filter media 52 during a cleaning cycle.

The top fitting 56 has an upper annular flange 60 with an outer diameter greater than the hole diameter D in the tube sheet 32. The insider diameter of the flange 60 is less than the hole diameter D in the tube sheet 32 and forms the opening of the mouth into the filter cartridge 38. Immediately beneath the flange 60 is a groove 62 formed in the side wall 64 of the top fitting 56. The groove 62 is sized to substantially conform to the shape and diameter of the hole diameter D in the tube sheet 32 in order to seal therewith when the filter cartridge 38 is installed as shown. The side wall 64 extends downwardly to integrally join a stepped portion 66 which overlies the pleat pack. A mold ridge 68 or series of bosses in the stepped portion results from the portion of the central mold part that supports the pleat pack during the molding process. From the stepped portion 66, inner and outer skirts 70 & 72 extend downwardly to form the inner and outer surfaces of the portion of the molding material that bonds to the core 50 and pleated filter media 52. In other words, outer skirt 72 forms the lower outside diameter of the top fitting and is slightly smaller in size than the diameter D of the tube sheet hole. The inner skirt 70 forms the circular bore of the top fitting 56 and substantially corresponds to the inside diameter of the core 50.

So that the filter cartridge 38 could be installed in and removed from the tube sheet 32, the material of construction of the top fitting 56 and length of the side wall 64 were of critical importance. The molding material was preferably a urethane having a durometer of between 30 to 70 shore A. The side wall 64 was extended downwardly a sufficient length to satisfy the relationship of $0.3 < H/D < 0.85$ where D was the diameter of the tube sheet hole and H was the distance between the peripheral groove and the top of the pleat pack encased in the molding material. These features, in combination, permitted sufficient resiliency in the upper portion of the top fitting 56 to deform during installation or removal of the filter 38 in the tube sheet 32 and also to provide a reasonably effective seal between the peripheral groove 62 and the hole through the tube sheet 32.

Another typical prior art filter cartridge 74 is illustrated in FIG. 4. The cartridge 74 includes a central cylindrical core 50 of foraminous plastic which supports a cylindrical ring of pleated filter media 52. A molded bottom end cap (not shown) sealingly closes the lower ends of both the core 50 and filter media 52 of the pleat pack. The upper end of the pleat pack is terminated with an open mouthed, molded top fitting 76, the details of which differ from those shown in FIGS. 2 & 3.

The top fitting 76 has an upper annular flange 78 with an outer diameter greater than the hole diameter D in the tube sheet 32. The inside diameter of the flange 60 is less than the hole diameter D in the tube sheet 32 and forms the opening of the mouth into the filter cartridge 74. Immediately beneath the flange 78 is a substantially straight side wall 80 which throughout its length has a diameter smaller that the diameter of the tube sheet hole 82.

Interiorly of the mouth of the top fitting 76 and coincident with a portion of the flange 78 is a stepped portion 84. The stepped portion 84 commonly included a mold ridge 86 or series of bosses resulting from the portion of the central mold part that supported the pleat pack during the molding process. In order to provide sufficient mass of molding material, it was necessary that the inner skirt 88 of the top fitting 76 be thickened which rendered the inside bore of the top fitting 76 smaller than the bore of the central core 50.

Another important feature of this prior art construction was the provision of the pleat pack extending upwardly almost to the flange 78 of the top fitting 76. This provided rigidity to the top fitting 76 that was necessary in order to seal the cartridge 74 to the tube sheet 32. As illustrated, the tube sheet opening 82 was fitted with an annular ring gasket 90 having a groove to receive the edges of the tube sheet opening 82. The inside opening of the gasket 90 was smaller than the diameter of the tube sheet opening 82 and also smaller than the outside diameter of the side wall 80 throughout most of its length. The gasket 90 was fabricated from a resiliently deformable elastomeric. When the cartridge 74 was fully installed, the region of the top fitting 76 beneath the flange 78 would compress the gasket 90 between the side wall 80 and the edge of the tube sheet hole 82 and cause the bulbous lower end of the gasket 90 to be biased against the underside of the sube sheet to effect a seal.

Attention is now turned to FIGS. 5 through 9 illustrating the features of construction embodied in the filter cartridges of this invention. The filter cartridge 100 includes a central cylindrical core 102 formed by foraminous plastic. Circumscribing the central core 102 is a cylindrical ring of pleated filter media 104 which together with the support core 102 forms a pleat pack. A molded bottom end cap 106 sealingly closes the lower ends of both the core 102 and filter media 104 of the pleat pack. A groove 108 extends around the exterior of the end cap 106 from a ridge in the end cap mold (not shown) employed to center the pleat pack during the molding process. Similarly, a groove 110 or series of bosses are present in the lowermost surface of the end cap 106 from a ridge in the end cap mold employed to support the pleat pack during the molding process.

The upper end of the pleat pack is terminated with an open mouthed, molded top fitting 112. Intermediate the top fitting 112 and the bottom end cap 106 are retaining bands 114 spaced apart along the length of the filter cartridge 100. The retaining bands 114 serve to limit flexure of the pleated filter media 104 during a cleaning cycle.

The top fitting 112 has an upper annular flange 116 with an outer diameter greater than the hole diameter in the tube sheet 119 in which the filter cartridge 100 is to be installed as shown in FIGS. 8 & 9. Immediately beneath the flange 116 is a contoured side wall 118 which throughout its length has a diameter smaller that the hole diameter of the tube sheet 119. The side wall 118 includes a spiral thread 120 around the exterior surface thereof. Downwardly from the spiral thread 120 is a sealing gasket ridge 122 which transitions to the outer skirt 124 of the top fitting 112.

Interiorly of the mouth of the top fitting 112 and extending from the flange 116, either continuously or from a slight stepped molding ledge 125, is molded a rounded shoulder 126 covering at least the thickness of the pleat pack and terminating in a throat 128. The throat 128 of the top fitting 112 substantially matches the inside bore of the circular core 102.

Spaced radially around the shoulder 126 at approximately 120° angular increments are three tapered holes 130 resulting from tapered molding pins in the top fitting mold (not shown) employed to support the pleat pack during the molding process. Optionally, if additional support is necessary for the pleat pack, then six tapered holes on 60° angular increments may be provided.

Since the outermost diameter of the side wall 118 of the top fitting 112 is less than the diameter of the hole in the tube sheet 119, a sealing gasket 132 is required as shown in FIGS. 8 & 9. The gasket 132 is preferably fabricated from resiliently deformable elastomeric material.

The sealing gasket 132 includes an upper flange 134 to overlie the tube sheet 119 and a contoured cuff 136 to penetrate the hole through the tube sheet 119. When the filter cartridge 100 is pushed through the sealing gasket 132 and fully seated on the tube sheet 119, as shown in FIG. 9, the side wall 118 and spiral thread 120 pushes outwardly on the cuff 136 to seal against the inside bore of the hole through the tube sheet 119. A twisting motion during installation will permit the spiral thread 120 to assist in fully seating the filter cartridge 100 if a downward force is insufficient. Likewise, an opposite twisting motion during removal of the filter cartridge 100 will permit the spiral thread 120 to assist in the event the filter 100 and gasket 132 are seized to the tube sheet 119.

As shown in FIG. 7b, the molded spiral thread 120 may be eliminated depending upon the operating conditions experienced. In such event, the side wall 118 extends substantially straight downward from the flange 116 to the gasket locking ridge 122.

If, during operation of the baghouse, the filter cartridge 100 works upwardly on the tube sheet 119, the locking ridge 122 can engage the lower edge of the gasket cuff 136 to maintain a seal and to prevent the filter cartridge 100 from becoming dislodged.

The top fitting 112 may be fabricated from any suitable molding compound such as urethane, polyurethane, fluorocarbons, silicon compounds and the like. Rigid or flexible materials may be employed. The exterior surface of the top fitting 112 includes some slight undercut features such as the spiral thread 120 and gasket locking ridge 122. With these features included, the top fitting 112 may be preferably formed of a material having a durometer reading with 60 to 90 shore A. With such material, the fitting 112 can still be removed from a single piece external mold prior to being fully cured. This permits the top fitting 112 to be molded without vertical parting lines as has been necessary with prior art filters. Instead, the parting line of the top fitting 112 consists of a line corresponding to the upper edge of the flange 116. This region, of course, is not involved in the sealing function of the filter 100 to the tube sheet 119 and gasket 132 so the mold parting line of the fitting 112 represents no possible leakage source.

With modifications, the foregoing principles of construction for a cylindrical filter cartridge 100 may be adapted to filter cartridges 140 having an oblong cross-section. Attention is now focused on the embodiment illustrated in FIGS. 10-12.

As used in this application, the term oblong describes an elongate shape with semicircular ends, each end having the same diameter, and spaced apart parallel sides emanating from the semicircular ends. In terms of overall length and width dimensions of such an oblong shape, the cross-sectional area of the shape satisfies the relationship of the width times the length minus 0.2146 times the width squared (i.e., $A = WL - 0.2146W^2$).

The filter cartridge 140 includes an oblong central core 142 formed by foraminous plastic. Circumscribing the central core 142 is an oblong tube of pleated filter media 144 which together with the support core 142 forms a pleat pack. A molded bottom end cap 146 sealingly closes the lower ends of both the core 142 and filter media 144 of the pleat pack. A groove 148, or series of bosses, is present in the lowermost surface of the end cap 146 from a ridge in the end cap mold (not shown) employed to support the pleat pack during the molding process.

The upper end of the pleat pack is terminated with an oblong, open mouthed, molded top fitting 150. The top fitting 150 has an oblong upper annular flange 152 which is sized to overlie the oblong hole in the tube sheet 154 in which the filter cartridge 140 is to be installed. Since the cross-sectional length of the oblong shape is much greater than the width thereof, the construction is strengthened with a metal collar 156 bonded to the molding material forming the top fitting 150. The metal collar 156 includes a flange portion 158 to overlie the tube sheet 154 and an integrally joined cuff 160 sized slightly smaller than the oblong opening in the tube sheet 154 in order to penetrate such opening. At opposite corners of the flange portion 158 are provided holes 162 to receive threaded mounting bolts (not shown) for securing the metal collar 156 to the tube sheet 154.

Interiorly of the mouth of the top fitting 150 and extending smoothly continuous from the uppermost surface of the flange 152, is molded a rounded shoulder 164 covering at least the thickness of the pleat pack and terminating in an oblong throat 166. The throat 166 of the top fitting 150 substantially matches the inside oblong bore of the core 142.

Spaced around the oblong shoulder 164 are tapered holes 168 resulting from tapered molding pins in the top fitting mold (not shown) employed to support the pleat pack during the molding process.

In order to seal the filter cartridge 140 against the tube sheet 154, an oblong compressible gasket 170 is positioned between the upper surface of the tube sheet 154 and the underside of the flange portion 158 of the metal collar 156. When installed, the metal collar 156 may be biased to the tube sheet 154 with threaded bolts extending through the holes 162, thus compressing the gasket 170 against the tube sheet 154 and forming a leak proof seal between the filter 140 and the tube sheet 154.

Figure 12:
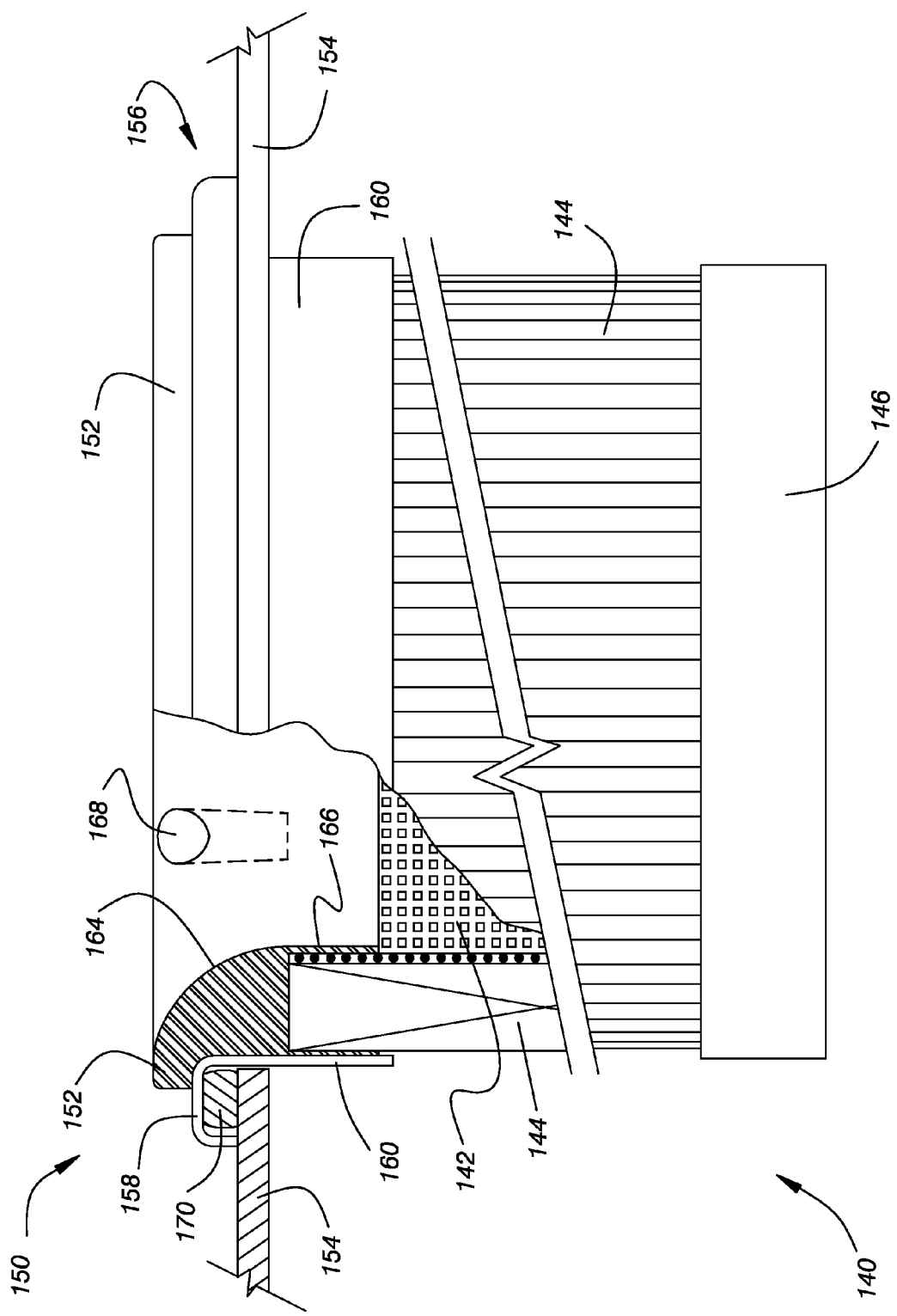
FIG. 12 is a side elevation view, partially sectional, of the filter cartridge shown in FIGS. 10 & 11.
Figure 15:
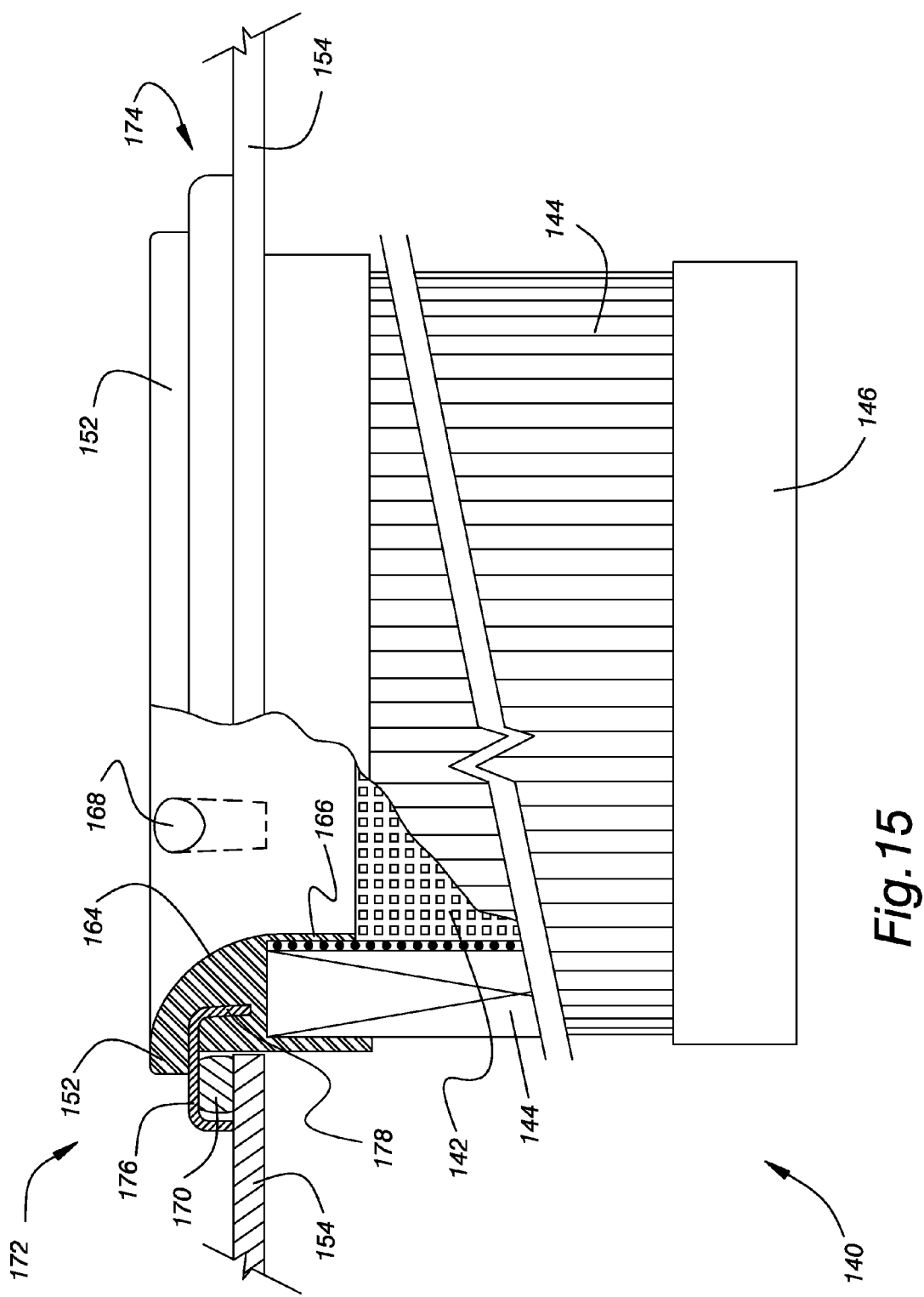
FIG. 15 is a side elevation view, partially section, of the filter cartridge shown in FIGS. 13 & 14.

FIGS. 13-15 are very similar to FIGS. 10-12 but illustrates a top fitting 172 with a modified metal collar 174. The metal collar 174 includes a flange portion 176 to overlie the tube sheet 154 and an integrally joined cuff 178 with a much reduced inner diameter than the metal collar 156 of FIGS. 10-12. Accordingly, the cuff 178 and a portion of the flange 176 extend into the molding material forming the top fitting 172 but not so far as to interfere with the molding pins which support the pleat pack during the molding process. This configuration creates a strong bond between the molding material and the metal collar 174.

Figure 18:
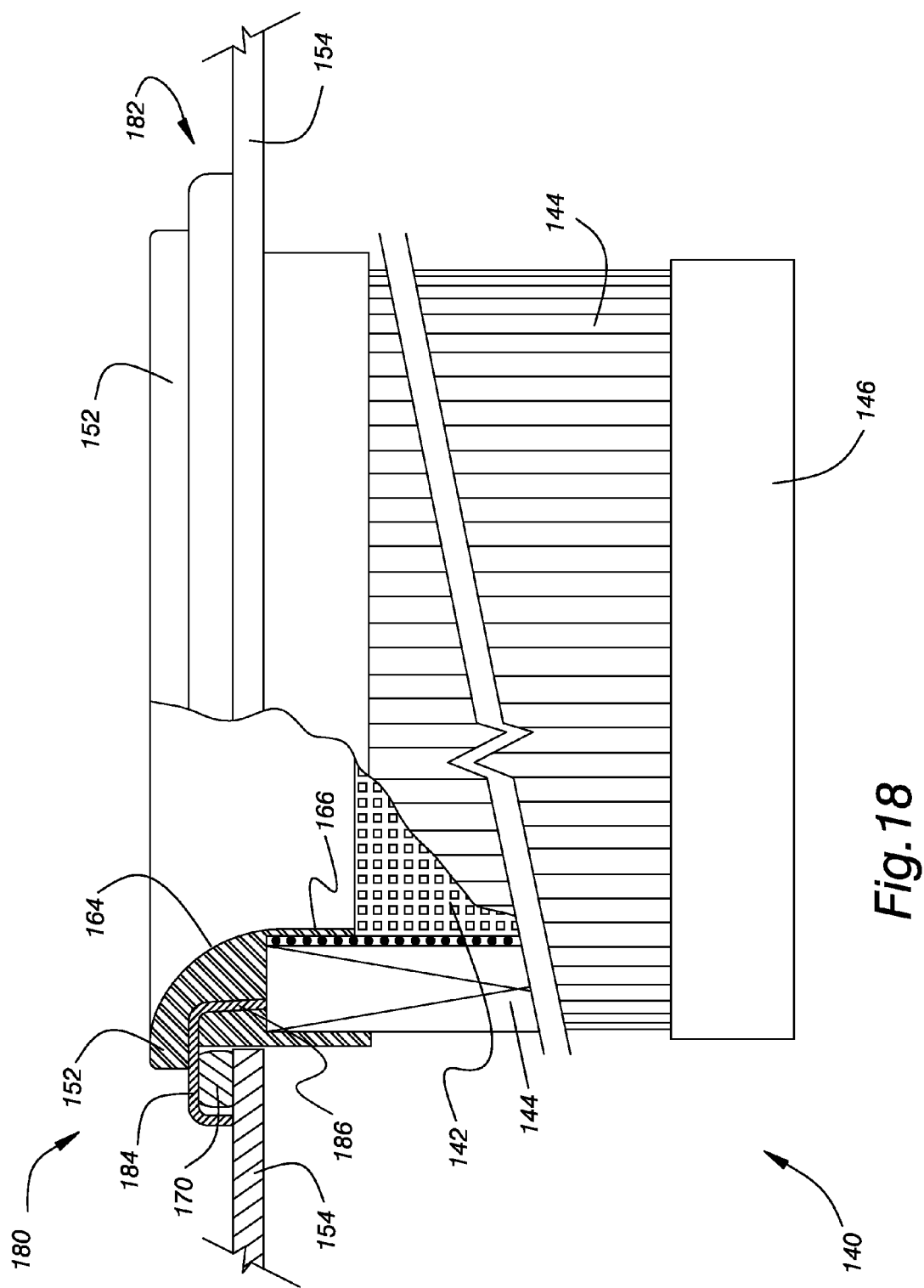
FIG. 18 is a side elevation view, partially sectional, of the filter cartridge shown in FIGS. 16 & 17.

Likewise, FIGS. 16-18 are very similar to FIGS. 10-12 and to FIGS. 13-15 but illustrate a top fitting 180 with a further modified metal collar 182. The metal collar 182 includes a flange portion 184 to overlie the tube sheet 154 and an integrally joined cuff 186 with a much reduced inner diameter than the metal collar 156 of FIGS. 10-12. Accordingly, the cuff 186 and a portion of the flange 184 extend into the molding material forming the top fitting 180 which creates a strong bond between the molding material and the metal collar 182. In this modified construction, the cuff 186 extends downwardly a sufficient distance to engage the pleated filter media 144 of the pleat pack. In other words, during the molding process, the pleat pack is supported on the edge of the cuff 186. This eliminates the need for molding pins to support the pleat pack and, consequently, eliminates the tapered holes 168 present in the rounded shoulder 164 of the FIGS. 10-12 and FIGS. 13-15 constructions.

The top fittings 150, 172 or 180 of FIGS. 10-18 may be fabricated from any suitable molding compound such as urethane, polyurethane, fluorocarbons, silicon compounds and the like. Rigid or flexible materials may be employed, but typically more rigid materials are preferred and provide a better bond with metal collars used to reinforce the structural integrity of the top fitting. The presence of the metal collar in these top fittings require the use of a two part mold. However, the parting lines remain horizontal with respect to the top fitting so as to eliminate any vertical parting lines which might represent a potential leakage source.

Although the filters illustrated and described with respect to FIGS. 10-18 are oblong in cross-section, the metal collars of such filters may be incorporated in filters which are circular in cross-section such as those disclosed in FIGS. 5-9.

Whether the cartridge filters constructed in accordance with this invention take the form of cylindrical filters as shown in FIGS. 5-9 or the form of oblong filters as shown in FIGS. 10-18, the interior shape of the top fitting is critically important. In each instance, the interior is formed with a rounded shoulder as previously described to create a bell-shaped inlet mouth as an uninterrupted transition from the mouth opening to the bore of the support core within the filter cartridge.

Most preferably, the rounded shoulder 126 or 164 of both the circular and oblong filter constructions previously described takes the form of a complex contoured surface of compound radii of curvatures. In the case of the rounded shoulder 126 of the circular filter 100 as shown in FIGS. 5-9, the compound radii of curvatures relate to the bore diameter D of the throat 128 of the top fitting 112 which corresponds closely to the bore of the structural core 102. This relationship is illustrated in FIG. 19. The initial opening of the mouth 188 of the top fitting 112 extends from the flange 116 with a radius $R_1$ equal to 0.2 times the diameter D of the throat 128. The center for the radius $R_1$ is located a distance of 0.75D from the longitudinal centerline 190 of the top fitting 112 and a distance of 0.2D down from the plane 192 forming the initial opening of the mouth 188. A second radius of curvature $R_2$ equal to D/3 extends from a tangent to the radius $R_1$ to transition to the bore diameter D of the throat 128. The center for the radius $R_2$ is located a distance of 0.833D from the longitudinal centerline 190 of the top fitting 112 and a distance of 0.304D down from the plane 192 forming the initial opening of the mouth 188.

By way of a specific example, a circular filter may have a bore diameter D equal to 3.6 inches. The initial opening of the mouth 188 of the top fitting 112 extends from the flange 116 with a radius $R_1$ equal to 0.72 inches (0.2×3.6) centered at a distance of 2.70 inches (0.75×3.6) from the longitudinal centerline 190 of the top fitting 112 and a distance of 0.72 inches (0.2×3.6) down from the plane 192 forming the initial opening of the mouth 188 to a tangent with the second radius of curvature $R_2$ equal to 1.20 inches (3.6/3) centered at a distance of 3.00 inches (0.833×3.6) from the longitudinal centerline 190 of the top fitting 112 and a distance of 1.09 inches (0.304×3.6) down from the plane 192 forming the initial opening of the mouth 188, to transition to the bore diameter D of the throat 128.

Filters constructed in accordance with the foregoing relationship offer surprising benefits. As determined by an independent testing laboratory comparing the bell-shaped mouth filter of this invention with a conventional stepped-top filter, the novel filter increases the available cleaning pressure by more than 10% and increases pulse-jet cleaning flow by 15% which yields a total cleaning power increase of more than 25%. Such performance is achieved without the additional pressure drop experienced during normal filtering operation when venturi equipment has been necessary to boost cleaning flow. The practical effects of increasing cleaning power include lowering resistance during normal filtering through the filter cartridge and less frequent cleaning cycles for a given operating period. Thus, less compressed air is needed. These benefits combine to result in lower energy consumption for baghouse operations.

In the case of an oblong filter such as illustrated in FIGS. 10-18, the rounded shoulder 164 still takes the form of a complex contoured surface of compound radii of curvatures but is determined with reference to a diameter equivalent $D_e$ computed by dividing the perimeter of the oblong shape by the mathematical constant π (pi=3.14159).

For example, applying the definition of term oblong used in this application, the overall shape comprises semicircular ends, each end having the same diameter, and spaced apart parallel sides emanating from the semicircular ends. If the sides of the oblong are spaced apart 1 inch and the overall length of the oblong is 4.6 inches, then $D_e$ equals 3.61 inches $[(\pi \times 1 + 2 \times 4.6 - 1)/\pi]$. In the case of an oblong, therefore, $D_e$ is used in the place of D as illustrated in FIG. 19. Accordingly, the radius $R_1$ equals 0.72 inches (0.2×3.61) centered a distance 0.72 inches (0.2$D_e$) down from the plane forming the initial opening of the mouth and a distance of 0.083$D_e$ from the bore (i.e., distance between the sides of the oblong) to a tangent with the second radius of curvature $R_2$ equal to 1.20 inches (3.61/3) centered at a distance of 1.10 inches (0.304$D_e$) down from the plane forming the initial opening of the mouth and a distance of 1.70 inches (bore/2+$R_2$) from the longitudinal centerline to transition to the bore of the throat.

In baghouses for high temperature applications, it is frequently necessary to use a structural core fabricated from foraminous metal. Since the dusty environment of a baghouse represents an explosion danger from static electricity, it is a standard industry practice to electrically ground filter cartridges having metallic components. The filter cartridges of this invention may be modified to include metallic cores and electrical grounds.

FIG. 20 illustrates a filter construction similar to FIGS. 13-15 but having a metallic core 194. A metal spring clip 196 is spot welded to the core 194 and, during the molding process, is embedded in the molding compound forming the top fitting 172. The spring clip 196 is biased to engagement with the inside surface of the cuff 178 of the metal collar 174. When installed, the flange portion 176 contacts the surface of the tube sheet 154 thereby establishing an electrical ground from the tube sheet 154, through the metal collar 174, and through the spring clip 196 to the core 194.

FIGS. 21 & 22 illustrate a filter construction similar to FIGS. 5-9 but having a metallic core 198. A grounding wire 200 is attached to the core 198 and, during the molding process, is threaded through the molding compound forming the top fitting 112. When the filter is installed on the tube sheet 119 of the baghouse as shown in FIG. 22, the grounding wire 200 is threaded between the top fitting 112 and the sealing gasket 132 to be connected to the tube sheet 119, or other grounding equipment of the baghouse. To supply an electrical ground to the metallic core 198.

From the foregoing it will be seen that this invention is one well adapted to attain all the ends and objects hereinabove set forth, together with the other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described my invention, I claim:

1. A high efficiency, unitary filter cartridge to be removably, but sealingly installed with a separate sealing gasket, in a uniform hole of the tube sheet for a pulse-jet baghouse, said filter cartridge comprising:
an elongate, perforated support conduit having a uniform internal bore and further having first and second ends;
a pleated filter sleeve geometrically circumscribing said support conduit and having first and second ends;
a bottom end cap secured to said second ends of said support conduit and filter sleeve to sealingly close said second ends;
a molded, open mouth top fitting secured to said first ends of said support conduit and filter sleeve, said top fitting having an upper flange configured and sized such that a portion of said flange overlies the tube sheet adjacent said hole therein, said top fitting having a side wall integrally formed with said upper flange to extend downwardly therefrom and being configured and sized to fit through said hole of the tube sheet in which said filter cartridge is installed, said top fitting having an interiorly flared open mouth with a rounded shoulder integrally formed with said upper flange and transitioning to a throat portion with a bore configured and sized to substantially correspond to said bore of said support conduit, wherein said rounded shoulder is continuously curved from said upper flange to said throat portion;
whereby, when said filter cartridge is installed in said hole of said tube sheet, said top fitting biases said sealing gasket to engagement with said tube sheet to create a leak proof seal between said top fitting and said tube sheet.

2. The filter cartridge as in claim 1 wherein said rounded shoulder of said filter mouth is formed as a smoothly contoured surface with compound radii of curvatures from a horizontal plane defining the opening of said mouth to the bore of said throat.

3. The filter cartridge as in claim 1 wherein said perforated support conduit is formed of foraminous plastic.

4. The filter cartridge as in claim 1 wherein said perforated support conduit is formed of foraminous metal.

5. The filter cartridge as in claim 4 including an electrical grounding wire connected to said support conduit and threaded through said top fitting to be exteriorly accessible for grounding to a suitable electrical ground of the baghouse.

6. The filter cartridge as in claim 1 said top fitting including a metal collar bonded to said top fitting for increased structural integrity, said metal collar having a flange configured and sized such that at least a portion thereof overlies the tube sheet adjacent said hole in which said filter cartridge is installed in order to compress said sealing gasket between said flange and said tube sheet, and said metal collar having a cuff portion contiguous with said flange and extending downwardly therefrom wherein said cuff is configured and sized smaller than said hole in the tube sheet in order to penetrate said hole when said filter cartridge is installed on the tube sheet.

7. The filter cartridge as in claim 6 said flange of said metal collar shaped as an inverted cup to contain said sealing gasket thereunder and said cuff portion contiguous with said flange and extending downwardly therefrom around the molding material of said top fitting to be received within said hole in the tube sheet.

8. The filter cartridge as in claim 6 wherein the outermost portion of said flange of said metal collar is shaped as an inverted cup to contain said sealing gasket thereunder and the innermost portion of said flange and said cuff portion is embedded within the molding material of said top fitting.

9. The filter cartridge as in claim 8 wherein the outermost portion of said flange of said metal collar is shaped as an inverted cup to contain said sealing gasket thereunder and the innermost portion of said flange and said cuff portion is embedded within the molding material of said top fitting, and said cuff portion extends downwardly a distance sufficient to contact the pleated filter sleeve and thereby support said sleeve and conduit during the molding process.

10. The filter cartridge as in claim 6 wherein said support conduit is fabricated of metal and said filter further includes an electrical grounding wire connected to said support conduit and threaded through said top fitting to be exteriorly accessible for grounding to a suitable electrical ground of the baghouse.

11. The filter cartridge as in claim 6 wherein said support conduit is fabricated of metal and said filter further includes an electrical spring clip secured to said support conduit and embedded within said top fitting to engage said metal collar for grounding to said tube sheet of the baghouse.

12. The filter cartridge as in claim 6 configured and sized in cross-section as an oblong shape.

13. The filter cartridge as in claim 12 configured and sized in cross-section such that said bore of said throat is formed with semicircular ends, each end having the same diameter, and with spaced apart parallel sides emanating from said semicircular ends.

14. The filter cartridge as in claim 12 having a width and length configured and sized in cross-section such that said bore of said throat is formed with semicircular ends, each end having the same diameter, and with spaced apart parallel sides emanating from said semicircular ends wherein the cross-sectional area satisfies the relationship $A = WL - 0.2146W^2$.

15. The filter cartridge as in claim 1 configured and sized in cross-section as a circular shape.

16. The filter cartridge as in claim 15 wherein the bore of said mouth includes a lateral distance D across said bore and said rounded shoulder of said filter mouth is smoothly contoured such that a first radius of curvature $R_1$ equal to 0.2D centered at a point located a distance of 0.75D from the longitudinal centerline of said lateral distance D and a distance of 0.2D down from said horizontal plane defining the opening of said mouth extends from said horizontal plane down to a second radius of curvature $R_2$ equal to D/3 centered at a point located a distance of 0.833D from the longitudinal centerline of said lateral distance D and a distance of 0.304D 0.2D down from said horizontal plane defining the opening of said mouth.

17. The filter cartridge as in claim 15, said top fitting including a spiral thread on the exterior surface of said side wall in order for an external torsional force to assist in installation and removal of the filter cartridge from the tube sheet of the baghouse.

18. The filter cartridge as in claim 15, said top fitting including an outwardly projecting circumferential ridge on the exterior surface of said side wall in order engage a portion of said sealing gasket and to prevent said filter cartridge from working loose from its installed condition on the tube sheet of the baghouse.

* * * * *